United States Patent
Mugunda et al.

(10) Patent No.: US 10,877,553 B2
(45) Date of Patent: Dec. 29, 2020

(54) SYSTEMS AND METHODS FOR POWER CONTROL BASED ON POWER CONSUMPTION OF STORAGE DEVICES

(71) Applicant: Dell Products L.P., Round Rock, TX (US)

(72) Inventors: Chandrasekhar Mugunda, Austin, TX (US); Yogesh P. Kulkarni, Round Rock, TX (US); Balaji Bapu Gururaja Rao, Austin, TX (US); Rui An, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 195 days.

(21) Appl. No.: 15/953,243

(22) Filed: Apr. 13, 2018

(65) Prior Publication Data

US 2019/0317592 A1 Oct. 17, 2019

(51) Int. Cl.
  *G06F 1/32* (2019.01)
  *G06F 1/3296* (2019.01)
  *G06F 9/50* (2006.01)
  *G06F 1/3209* (2019.01)

(52) U.S. Cl.
  CPC .......... *G06F 1/3296* (2013.01); *G06F 1/3209* (2013.01); *G06F 9/5011* (2013.01)

(58) Field of Classification Search
  CPC ................. G06F 1/32; G06F 1/26; G06F 9/44
  See application file for complete search history.

(56) References Cited

U.S. PATENT DOCUMENTS

| | | | | |
|---|---|---|---|---|
| 2006/0230295 A1* | 10/2006 | Schumacher | ............. | G06F 1/28 713/300 |
| 2013/0138980 A1* | 5/2013 | Wang | .................. | H04L 12/6418 713/300 |
| 2013/0318371 A1* | 11/2013 | Hormuth | ................... | G06F 1/28 713/320 |
| 2014/0059359 A1* | 2/2014 | Bahirat | ................... | G06F 1/324 713/300 |
| 2015/0127188 A1* | 5/2015 | Mundt | .................. | F04D 19/024 700/300 |
| 2017/0322613 A1* | 11/2017 | Lin | ........................ | G06F 1/3209 |

* cited by examiner

*Primary Examiner* — Keshab R Pandey
(74) *Attorney, Agent, or Firm* — Jackson Walker L.L.P.

(57) ABSTRACT

A system may include a rack, a rack manager, and a block controller. The rack manager may be configured to communicatively couple to each of respective baseboard management controllers of information handling systems of the rack and also configured to manage power consumption by information handling resources housed in the rack. The block controller may be configured to monitor and report information regarding power consumption by the plurality of storage resources to the at least one of the baseboard management controllers, the at least one of the baseboard management controllers may be configured to communicate the information regarding power consumption by the plurality of storage resources to the rack manager, and the rack manager may be configured to manage power consumption by information handling resources housed in the rack based on the information regarding power consumption by the plurality of storage resources.

18 Claims, 2 Drawing Sheets

SYSTEMS AND METHODS FOR POWER CONTROL BASED ON POWER CONSUMPTION OF STORAGE DEVICES

TECHNICAL FIELD

The present disclosure relates in general to information handling systems, and more particularly to power control of a rack comprising information handling systems based on power consumption of storage devices present in the rack.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In a data center of multiple information handling systems (e.g., server nodes), a rack may include a plurality of information handling systems and a storage block comprising one or more sleds of storage resources. Such sleds are sometimes referred to JBODs, which stands for "just a bunch of disks." While the storage resources of such sleds may consume significant power in operation, in traditional implementations, such power consumption is not reported to a rack-level management system, and only power consumption of individual information handling resources may be reported. The lack of power reporting of power consumption by storage resources may have a deleterious effect on power management.

SUMMARY

In accordance with the teachings of the present disclosure, disadvantages and problems associated with power management in traditional rack systems may be reduced or eliminated.

In accordance with embodiments of the present disclosure, a system may include a rack, a rack manager, and a block controller. The rack may be configured to receive a plurality of server information handling systems, each server information handling system comprising a respective baseboard management controller, and configured to receive a plurality of storage resources. The rack manager may be configured to communicatively couple to each of the respective baseboard management controllers and configured to manage power consumption by information handling resources housed in the rack. The block controller may be communicatively coupled to at least one of the baseboard management controllers. The block controller may further be configured to monitor and report information regarding power consumption by the plurality of storage resources to the at least one of the baseboard management controllers, the at least one of the baseboard management controllers may be configured to communicate the information regarding power consumption by the plurality of storage resources to the rack manager, and the rack manager may be configured to manage power consumption by information handling resources housed in the rack based on the information regarding power consumption by the plurality of storage resources.

In accordance with these and other embodiments of the present disclosure, a method may include, in a system comprising a rack configured to receive a plurality of server information handling systems, each server information handling system comprising a respective baseboard management controller, and configured to receive a plurality of storage resources, a rack manager configured to communicatively couple to each of the respective baseboard management controllers and configured to manage power consumption by information handling resources housed in the rack, and a block controller communicatively coupled to at least one of the baseboard management controllers: monitoring and reporting, by the block controller, information regarding power consumption by the plurality of storage resources to the at least one of the baseboard management controllers; communicating, by the at least one of the baseboard management controllers to the rack manager, the information regarding power consumption by the plurality of storage resources; and managing, by the rack manager, power consumption by information handling resources housed in the rack based on the information regarding power consumption by the plurality of storage resources.

In accordance with these and other embodiments of the present disclosure, an article of manufacture may include a non-transitory computer readable medium and computer-executable instructions carried on the computer readable medium, the instructions readable by a processor, the instructions, when read and executed, for causing the processor to, in a system comprising a rack configured to receive a plurality of server information handling systems, each server information handling system comprising a respective baseboard management controller, and configured to receive a plurality of storage resources, a rack manager configured to communicatively couple to each of the respective baseboard management controllers and configured to manage power consumption by information handling resources housed in the rack, and a block controller communicatively coupled to at least one of the baseboard management controllers: monitor and report, by the block controller, information regarding power consumption by the plurality of storage resources to the at least one of the baseboard management controllers; communicate, by the at least one of the baseboard management controllers to the rack manager, the information regarding power consumption by the plurality of storage resources; and manage, by the rack manager, power consumption by information handling resources housed in the rack based on the information regarding power consumption by the plurality of storage resources.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
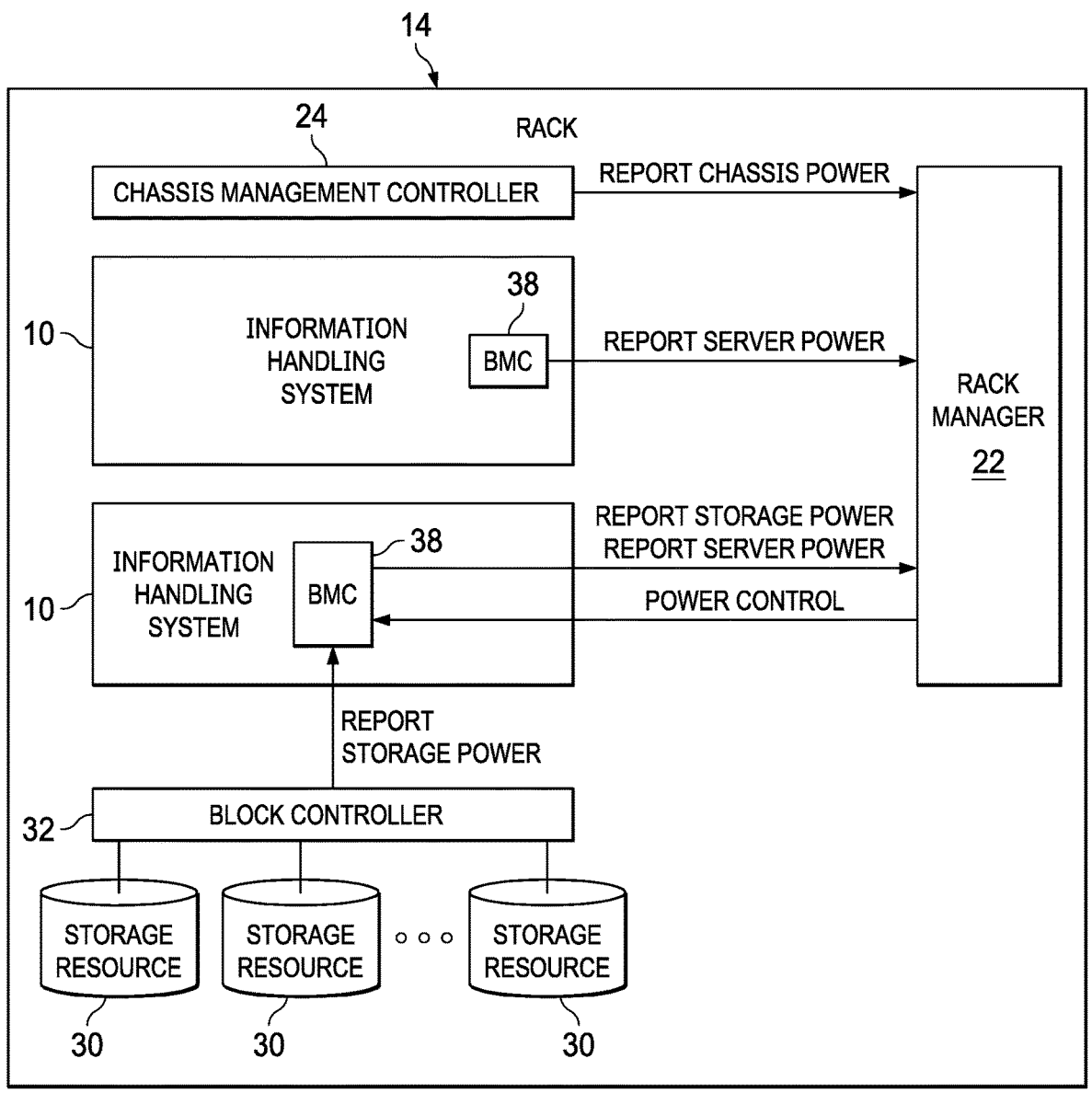
FIG. 1 illustrates a block diagram of selected components of an information handling system rack, in accordance with embodiments of the present disclosure.
Figure 2:
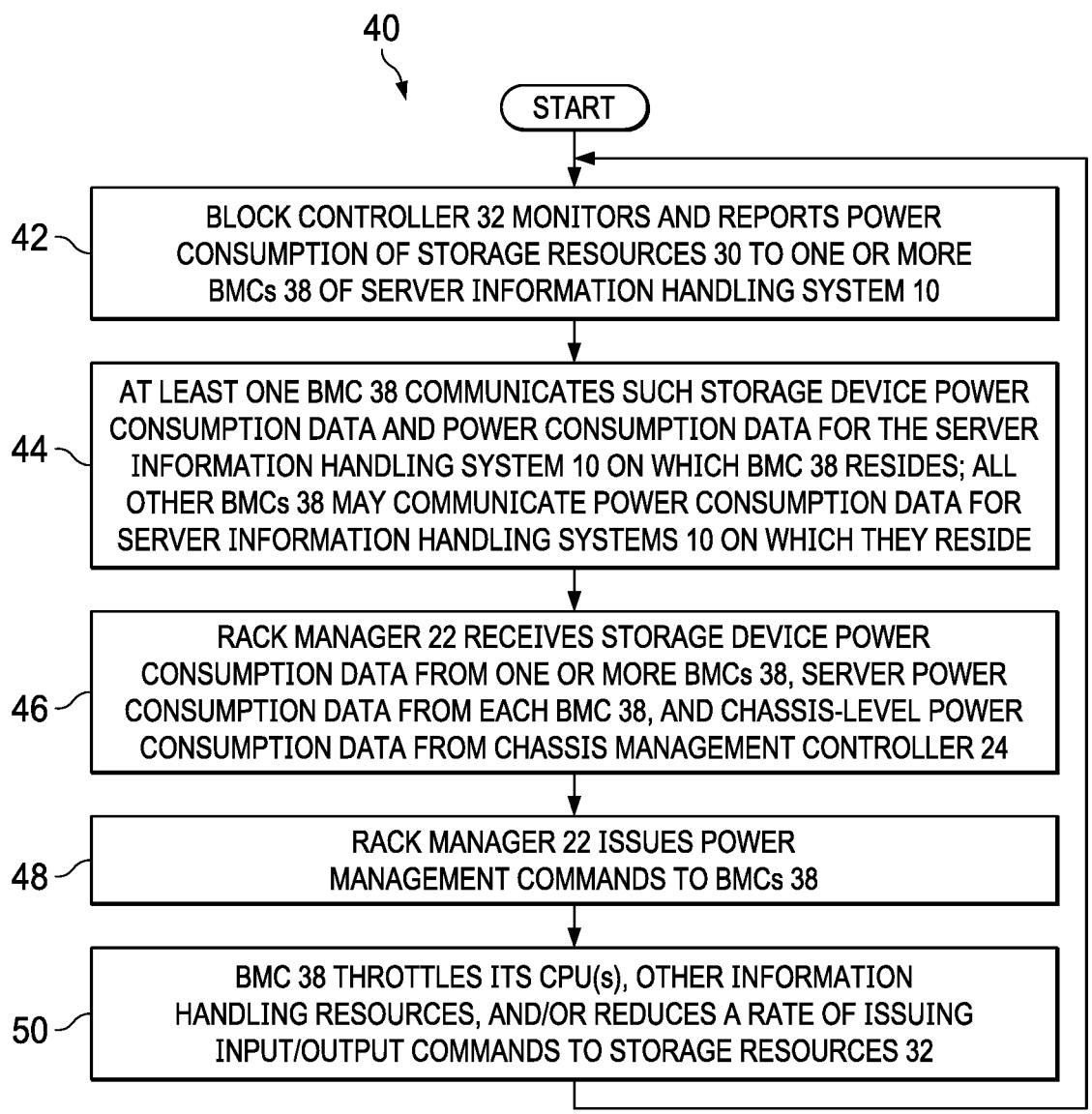
FIG. 2 illustrates a flow chart of an example method for power control based on power consumption of storage devices, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, buses, memories, I/O devices and/or interfaces, storage resources, network interfaces, motherboards, integrated circuit packages; electro-mechanical devices (e.g., air movers), displays, and power supplies.

FIG. 1 illustrates a block diagram of selected components of an information handling system rack 14, in accordance with embodiments of the present disclosure. Rack 14 may comprise any suitable enclosure, chassis, and/or housing for information handling systems 10 and other electronic components. As shown in FIG. 1, rack 14 may house one or more server information handling systems 10, a block of one or more storage resources 30, a block controller 32 for controlling the block of one or more storage resources 30, a chassis management controller 24, and a rack manager 22.

Although not explicitly shown in FIG. 1 for the purposes of clarity and exposition, a server information handling system 10 may comprise a housing that may include a motherboard that provides structural support and electrical signal communication for processing components disposed in such housing that cooperate to process information. For example, a motherboard of a server information handling system 10 may include one or more central processing units (CPUs) that may execute instructions stored in random access memory (RAM) to process information, such as responses to server requests by client information handling systems remote from information handling system 10. As explicitly shown in FIG. 1, each server information handling system 10 may comprise a baseboard management controller (BMC) 38 to provide out-of-band management functions, such as remote power up, remote power down, firmware updates, and power management. For example, BMC 38 may receive an allocation of power from rack manager 22 and monitor operations of the processing components of information handling system 10 to ensure that power consumption does not exceed the allocation. As another example, BMC 38 may receive temperatures sensed by temperature sensors and apply the temperatures to ensure that thermal constraints are not exceeded.

Chassis management controller 24 may be configured to provide out-of-band management facilities for management of information handling resources of rack 14 other than server information handling systems 10 and storage resources 30. For example, chassis management controller 24 may monitor and report power consumption of peripheral devices such as network devices, switches, and/or other chassis-level information handling resources of rack 14.

Storage resources 30 may comprise one or more persistent storage devices, such as hard disk drives, solid state storage devices, or other persistent storage media that may store information maintained for extended periods and during power off states. Block controller 32 may comprise any suitable system, device, or apparatus for control of storage resources 30. For example, block controller 32 may monitor and report power consumption of storage resources 30 to a BMC 38 of a server information handling system 10.

In general, rack manager 22 may comprise any system, device, or apparatus for management of the various server information handling systems 10 within rack 14 and may be coupled to BMC 38 of each server information handling system 10 via a management interface (e.g., I2C bus). In operation, rack manager 22 may serve as a management interface between a user (e.g., an administrator or information technology professional) and the various server information handling systems 10 thus allowing such a user to manage server information handling systems 10 (e.g., monitor operation of server information handling systems 10, configure operation of server information handling systems 10, etc.). In some embodiments, rack manager 22 may aid coordination of operating settings so that information handling systems 10 do not exceed thermal or power usage constraints.

In operation, as mentioned above, block controller 32 may monitor and report power consumption of storage resources 30 to a BMC 38 of a server information handling system 10, thus creating a data path for power consumption reporting from storage resources 30 to BMC 38. BMC 38 may then communicate such storage device power consumption data, along with power consumption data for the server information handling system 10 itself. Rack manager 22 may receive such storage device power consumption data from one or more BMCs 38, server power consumption data from each BMC 38, and chassis-level power consumption data from chassis management controller 24, and based thereon, issue power management commands to BMCs 38. Such power management commands may include commands to cap power consumption and/or throttle operation of CPUs and/or other information handling resources. In response to such power management commands, a BMC 38 may throttle its CPU(s) and/or other information handling resources, or take other steps to reduce power consumption, including without limitation reducing a rate of issuing input/output commands to storage resources 30, in order to reduce power consumption of storage resources 30.

FIG. 2 illustrates a flow chart of an example method 40 for power control based on power consumption of storage devices, in accordance with embodiments of the present disclosure. According to certain embodiments, method 40 may begin at step 42. As noted above, teachings of the present disclosure may be implemented in a variety of configurations of rack 14. As such, the preferred initialization point for method 40 and the order of the steps comprising method 40 may depend on the implementation chosen. In these and other embodiments, method 40 may be implemented as firmware, software, applications, functions, libraries, or other instructions.

At step 42, block controller 32 may monitor and report power consumption of storage resources 30 to one or more BMCs 38 of server information handling systems 10. At step 44, at least one BMC 38 may communicate such storage device power consumption data, along with power consumption data for the server information handling system 10 on which BMC 38 resides. In addition, all other BMCs 38 may communicate power consumption data for the server information handling systems 10 on which they reside.

At step 46, rack manager 22 may receive such storage device power consumption data from one or more BMCs 38, server power consumption data from each BMC 38, and chassis-level power consumption data from chassis management controller 24. At step 48, based on the received power consumption information, rack manager 22 may issue power management commands to BMCs 38. Such power management commands may include commands to cap power consumption and/or throttle operation of CPUs and/or other information handling resources.

At step 50, in response to such power management commands, a BMC 38 may throttle its CPU(s) and/or other information handling resources, or take other steps to reduce power consumption, including without limitation reducing a rate of issuing input/output commands to storage resources 30, in order to reduce power consumption of storage resources 30.

Although FIG. 2 discloses a particular number of steps to be taken with respect to method 40, method 40 may be executed with greater or fewer steps than those depicted in FIG. 2. In addition, although FIG. 2 discloses a certain order of steps to be taken with respect to method 40, the steps comprising method 40 may be completed in any suitable order.

Method 40 may be implemented using rack manager 14, components thereof, and/or any other system operable to implement method 40. In certain embodiments, method 40 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A system comprising:
    a rack configured to receive a plurality of server information handling systems, each server information handling system comprising a respective baseboard management controller, and configured to receive a storage enclosure including a plurality of storage resources that are separate from the plurality of server information handling systems;
    a rack manager configured to communicatively couple to each of the respective baseboard management controllers and configured to manage power consumption by information handling resources housed in the rack; and
    a block controller including block controller circuitry, the block controller being communicatively coupled to at least one of the baseboard management controllers;
    wherein:
        the block controller is further configured to monitor and report information regarding power consumption by the plurality of storage resources to the at least one of the baseboard management controllers;
        the at least one of the baseboard management controllers is configured to communicate the information regarding power consumption by the plurality of storage resources to the rack manager; and the rack manager is configured to manage power consumption by information handling resources housed in the rack based on the information regarding power consumption by the plurality of storage resources.

2. The system of claim 1, wherein:

the baseboard management controllers are configured to communicate information regarding power consumption by their respective server information handling systems to the rack manager; and the rack manager is configured to manage power consumption by information handling resources housed in the rack based on the information regarding power consumption by the plurality of storage resources and the information regarding power consumption by the respective server information handling systems.

3. The system of claim 2, wherein:

the system further comprises a chassis management controller configured to communicate information regarding power consumption by chassis-level information handling resources of the rack other than the server information handling systems and the storage resources; and the rack manager is configured to manage power consumption by information handling resources housed in the rack based on the information regarding power consumption by the plurality of storage resources, the information regarding power consumption by the respective server information handling systems, and the information regarding power consumption by chassis-level information handling resources.

4. The system of claim 1, wherein the rack manager is configured to manage power consumption by information handling resources housed in the rack by causing one or more of the server information handling systems to throttle their respective processors.

5. The system of claim 1, wherein the rack manager is configured to manage power consumption by information handling resources housed in the rack by causing one or more of the server information handling systems to operate subject to a power cap.

6. The system of claim 1, wherein the rack manager is configured to manage power consumption by information handling resources housed in the rack by controlling a rate of issuance of input/output commands from a server information handling system to the plurality of storage resources.

7. A method comprising, in a system comprising a rack configured to receive a plurality of server information handling systems, each server information handling system comprising a respective baseboard management controller, and configured to receive a storage enclosure including a plurality of storage resources that are separate from the plurality of server information handling systems, a rack manager configured to communicatively couple to each of the respective baseboard management controllers and configured to manage power consumption by information handling resources housed in the rack, and a block controller including block controller circuitry, the block controller being communicatively coupled to at least one of the baseboard management controllers:

monitoring and reporting, by the block controller, information regarding power consumption by the plurality of storage resources to the at least one of the baseboard management controllers;

communicating, by the at least one of the baseboard management controllers to the rack manager, the information regarding power consumption by the plurality of storage resources; and managing, by the rack manager, power consumption by information handling resources housed in the rack based on the information regarding power consumption by the plurality of storage resources.

8. The method of claim 7, further comprising:

communicating, by the baseboard management controllers, information regarding power consumption by their respective server information handling systems to the rack manager; and managing, by the rack manager, power consumption by information handling resources housed in the rack based on the information regarding power consumption by the plurality of storage resources and the information regarding power consumption by the respective server information handling systems.

9. The method of claim 8, further comprising:

communicating, by a chassis management controller integral to the system, information regarding power consumption by chassis-level information handling resources of the rack other than the server information handling systems and the storage resources; and managing, by the rack manager, power consumption by information handling resources housed in the rack based on the information regarding power consumption by the plurality of storage resources, the information regarding power consumption by the respective server information handling systems, and the information regarding power consumption by chassis-level information handling resources.

10. The method of claim 7, wherein managing power consumption by information handling resources housed in the rack comprises causing one or more of the server information handling systems to throttle their respective processors.

11. The method of claim 7, wherein managing power consumption by information handling resources housed in the rack comprises causing one or more of the server information handling systems to operate subject to a power cap.

12. The method of claim 7, wherein managing power consumption by information handling resources housed in the rack comprises controlling a rate of issuance of input/output commands from a server information handling system to the plurality of storage resources.

13. An article of manufacture, comprising a non-transitory computer readable medium; and computer-executable instructions carried on the computer readable medium, the instructions readable by a processor, the instructions, when read and executed, for causing the processor to, in a system comprising a rack configured to receive a plurality of server information handling systems, each server information handling system comprising a respective baseboard management controller, the rack further configured to receive a storage enclosure including a plurality of storage resources that are separate from the plurality of server information handling systems, a rack manager configured to communicatively couple to each of the respective baseboard management controllers and configured to manage power consumption by information handling resources housed in the rack, and a block controller including block controller circuitry, the block controller being communicatively coupled to at least one of the baseboard management controllers:

monitor and report, by the block controller, information regarding power consumption by the plurality of storage resources to the at least one of the baseboard management controllers;

communicate, by the at least one of the baseboard management controllers to the rack manager, the information regarding power consumption by the plurality of storage resources; and manage, by the rack manager, power consumption by information handling resources housed in the rack based on the information regarding power consumption by the plurality of storage resources.

14. The article of claim 13, the instructions for further causing the processor to:

communicate, by the baseboard management controllers, information regarding power consumption by their respective server information handling systems to the rack manager; and manage, by the rack manager, power consumption by information handling resources housed in the rack based on the information regarding power consumption by the plurality of storage resources and the information regarding power consumption by the respective server information handling systems.

15. The article of claim 14, the instructions for further causing the processor to:

communicate, by a chassis management controller integral to the system, information regarding power consumption by chassis-level information handling resources of the rack other than the server information handling systems and the storage resources; and manage, by the rack manager, power consumption by information handling resources housed in the rack based on the information regarding power consumption by the plurality of storage resources, the information regarding power consumption by the respective server information handling systems, and the information regarding power consumption by chassis-level information handling resources.

16. The article of claim 13, wherein managing power consumption by information handling resources housed in the rack comprises causing one or more of the server information handling systems to throttle their respective processors.

17. The article of claim 13, wherein managing power consumption by information handling resources housed in the rack comprises causing one or more of the server information handling systems to operate subject to a power cap.

18. The article of claim 13, wherein managing power consumption by information handling resources housed in the rack comprises controlling a rate of issuance of input/output commands from a server information handling system to the plurality of storage resources.

* * * * *